(12) United States Patent
Wang (10) Patent No.: US 9,776,364 B2
(45) Date of Patent: Oct. 3, 2017

(54) METHOD FOR INSTRUCTING A 3D PRINTING SYSTEM COMPRISING A 3D PRINTER AND 3D PRINTING SYSTEM

(71) Applicant: Apple Inc., Cupertino, CA (US)

(72) Inventor: Lejing Wang, Munich (DE)

(73) Assignee: Apple Inc., Cupertino, CA (US)

( * ) Notice: Subject to any disclaimer, the term of this patent is extended or adjusted under 35 U.S.C. 154(b) by 832 days.

(21) Appl. No.: 13/963,766

(22) Filed: Aug. 9, 2013

(65) Prior Publication Data
US 2015/0042755 A1    Feb. 12, 2015

(51) Int. Cl.
B29C 67/00    (2017.01)
H04N 13/02    (2006.01)
H04N 13/00    (2006.01)

(52) U.S. Cl.
CPC ...... B29C 67/0088 (2013.01); *H04N 13/0203* (2013.01); *H04N 2013/0081* (2013.01)

(58) Field of Classification Search
CPC ...... B29C 2795/00–2795/007; B29C 67/0051; B29C 67/0092; B33Y 10/00
See application file for complete search history.

(56) References Cited

U.S. PATENT DOCUMENTS

| | | | |
|---|---|---|---|
| 7,023,536 B2 | 4/2006 | Zhang et al. |
| 7,038,846 B2 | 5/2006 | Mandella |
| 7,088,440 B2 | 8/2006 | Buermann et al. |
| 7,110,100 B2 | 9/2006 | Buermann et al. |
| 7,113,270 B2 | 9/2006 | Buermann et al. |
| 7,161,664 B2 | 1/2007 | Buermann et al. |
| 7,203,384 B2 | 4/2007 | Carl |
| 7,268,956 B2 | 9/2007 | Mandella |
| 7,343,216 B2 | 3/2008 | Swift |
| 7,474,809 B2 | 1/2009 | Carl et al. |
| 7,729,515 B2 | 6/2010 | Mandella et al. |
| 7,826,641 B2 | 11/2010 | Mandella et al. |
| 7,961,909 B2 | 6/2011 | Mandella et al. |
| 8,016,421 B2 | 9/2011 | Eberl |
| 8,113,657 B2 | 2/2012 | Eberl |

(Continued)

FOREIGN PATENT DOCUMENTS

EP    2193825 A1    6/2010

OTHER PUBLICATIONS

Wang, Lejing, et al. "Parallax-free intra-operative X-ray image stitching." Medical Image Analysis 14.5 (2010): 674-686.

(Continued)

*Primary Examiner* — Michael Teitelbaum
(74) *Attorney, Agent, or Firm* — Blank Rome LLP (57) ABSTRACT

A method for instructing a 3D printing system that includes a 3D printer provided with a printing coordinate system to print at least one first object onto an existing second object comprises providing or receiving at least one image representing at least a part of the existing second object, determining or receiving an alignment between at least part of the at least one first object and at least part of the existing second object, determining a pose of the existing second object relative to the printing coordinate system according to the at least one image, and providing the 3D printing system with the pose and the alignment for the 3D printer to print at least part of the at least one first object onto the existing second object according to the pose and the alignment.

20 Claims, 8 Drawing Sheets

(56) References Cited

U.S. PATENT DOCUMENTS

| | | |
|---|---|---|
| 8,243,334 B2 | 8/2012 | Abeloe |
| 2005/0168437 A1 | 8/2005 | Carl et al. |
| 2010/0092079 A1 | 4/2010 | Aller |
| 2011/0087350 A1 | 4/2011 | Fogel et al. |
| 2011/0227915 A1 | 9/2011 | Mandella et al. |
| 2012/0038549 A1 | 2/2012 | Mandella et al. |
| 2012/0210255 A1 | 8/2012 | Ooi |
| 2012/0236031 A1 | 9/2012 | Haddick |
| 2012/0281013 A1 | 11/2012 | Mahdavi |
| 2013/0194418 A1 | 8/2013 | Gonzalez-Banos et al. |
| 2013/0206830 A1 | 8/2013 | Kugel |
| 2013/0215116 A1 | 8/2013 | Siddique |
| 2013/0329243 A1 | 12/2013 | Pettis |
| 2014/0022281 A1 | 1/2014 | Georgeson |
| 2014/0039663 A1* | 2/2014 | Boyer ............... B29C 67/0051 700/118 |
| 2014/0074274 A1 | 3/2014 | Douglas |
| 2014/0210947 A1* | 7/2014 | Finn ..................... G01C 15/002 348/46 |
| 2015/0093283 A1* | 4/2015 | Miller ................. A61F 2/3859 419/55 |

OTHER PUBLICATIONS

Andreas Kolb, Erhardt Barth, Reinhard Koch, Rasmus Larsen: Time-of-Flight Sensors in Computer Graphics. Eurographics 2009.

Alexandre Gillet, Michel Sanner, Daniel Stoffler, Arthur Olson, "Augmented Reality with Tangible Auto-Fabricated Models for Molecular Biology Applications," 2004, IEEE Visualization, pp. 235-241.

Alexandre Gillet, Michel Sanner, Daniel Stoffler, Arthur Olson, "Tangible Interfaces for Structural Molecular Biology," 2005, Structure, 13:483-491.

Anna Hilsmann, Peter Eisert, "Tracking and Retexturing Cloth for Real-Time Virtual Clothing Applications," 2009, Proceedings of the 4th International Conference on Computer Vision/Computer Graphics Collaboration Techniques, MIRAGE '09, pp. 94-105.

J. C. Verlinden, A. de Smit, A. W. J. Peeters, M. H. van Gelderen, "Development of a Flexible Augmented Prototyping System," 2003, Journal of WSCG, 22(1):1-8, ISSN: 1213-6972.

Jouke Verlinden, Imre Horvath, Edwin Edelenbox, "Treatise of Technologies for Interactive Augmented Prototyping," 2006, Proceedings of the TMCE 2006, pp. 1-14.

Siltanen, Sanni, "Theory and applications of marker-based augmented reality," Espoo 2012, VTT Science 3, http://www.vtt.fi/inf/pdf/science/2012/S3.pdf.

Stewart Von Itzstein, Bruce H. Thomas, Ross T. Smith, Sandy Walker, "Using Spatial Augment Reality for Appliance Design," 2011, IEEE Conference on Pervasive Computing and Communications Workshops (PERCOM Workshops), pp. 316-318.

* cited by examiner

METHOD FOR INSTRUCTING A 3D PRINTING SYSTEM COMPRISING A 3D PRINTER AND 3D PRINTING SYSTEM

BACKGROUND OF THE INVENTION

1. Technical Field

The present disclosure is related to a method for instructing a 3D printing system comprising a 3D printer and to a 3D printing system. The present disclosure is further related to a method for instructing a device communicating with a 3D printing system comprising a 3D printer.

2. Background Information

Commonly known 3D printers that could perform 3D printing processes to print a real object from an input of a virtual model are presently available to consumers. As known in the art, additive manufacturing based 3D printing is a promising and emerging technology to print or create a 3D or 2D real (i.e. physical and tangible) object of any shape. As known in the art, additive manufacturing or 3D printing is a process of making a three-dimensional solid object of virtually any shape from a virtual model. 3D printing is achieved using an additive process, where successive layers of material are laid down in different shapes. For example, to perform a print, the 3D printer reads the design from a file and lays down successive layers of liquid, powder, paper or sheet material to build the model from a series of cross sections. These layers, which correspond to the virtual cross sections from the virtual model, are joined or automatically fused to create the final shape. The primary advantage of this technique is its ability to create almost any three-dimensional shape or geometric feature.

The virtual model represents the geometrical shape of the real object to be built or printed. The virtual model could be any digital model or data that describes geometrical shape property, such as a computer-aided design (CAD) model or an animation model. The printed real object is tangible. The object or the part of the object may have a void or hollow in it, such as has a vase. The object or the part of the object may be rigid or resilient, for example.

3D printers are commonly based on additive manufacturing that creates successive layers in order to fabricate 3D real objects. Each lay could be created according to a horizontal cross-section of a model of a real object to be printed. 3D printers are typically used to create new physical objects that do not exist before.

In US 2011/0087350 A1, there is provided a method and system enabling the transform of possibly corrupted and inconsistent virtual models into valid printable virtual models to be used for 3D printing devices.

U.S. Pat. No. 8,243,334 A generates a 3D virtual model for the use in 3D printing by automatically delineating object of interest in images and selecting a 3D wire-frame model of an object if interest as the virtual model. The 3D wire-frame model may be automatically calculated from stereoscopic set of images.

U.S. Pat. No. 7,343,216 A proposes a method of assembling two real physical objects to have a final physical object. The method discloses an architectural site model facilitating repeated placement and removal of foliage to the model. The site model is constructed as an upper shell portion and a lower base portion, while the model foliage is attached to the shell portion. The upper shell portion of the site model is configured for removable attachment to the lower base portion. This method is not related to printing a physical object by a 3D printer.

SUMMARY OF THE INVENTION

The inventors found that there may exist a need for further applications of a 3D printer, such as extending an existing real object through printing additional objects onto a surface of the existing object by using a 3D printer. One challenge in such applications may be where to place the existing object or how to adjust one or more print heads of the printer such that the additional objects will be printed onto a desired area of the surface of the existing object in order to build a composed object satisfying a pre-determined alignment between the additional objects and the existing object.

None of the prior art as mentioned above discloses any solution to solve the problem of using a 3D printer to print at least one object onto a desired surface area of an existing object or a part of the existing object in order to build a composed object satisfying a pre-determined alignment between the at least one object and the existing object.

Therefore, it is an object of the invention to provide a method for instructing a 3D printing system comprising a 3D printer which is adapted to print at least one object onto a desired surface area of an existing object or a part of the existing object in order to build a composed object satisfying a pre-determined alignment between the at least one object to be printed and the existing object. A further object of the invention is to provide a corresponding 3D printing system.

In a first aspect, there is disclosed a method for instructing a 3D printing system comprising a 3D printer provided with a printing coordinate system to print at least one first object onto an existing second object, the method comprising: providing or receiving at least one image representing at least a part of the existing second object, determining or receiving an alignment between at least part of the at least one first object and at least part of the existing second object, determining a pose of the existing second object relative to the printing coordinate system according to the at least one image, and providing the 3D printing system with the pose and the alignment for the 3D printer to print at least part of the at least one first object onto the existing second object according to the pose and the alignment.

According to another aspect, there is provided a 3D printing system adapted for printing at least one first object onto an existing second object comprising: a 3D printer provided with a printing coordinate system and a processing device adapted to receive at least one image representing at least a part of the existing second object. The processing device is further adapted to determine an alignment between at least part of the at least one first object and at least part of the existing second object, and further adapted to determine a pose of the existing second object relative to the printing coordinate system according to the at least one image. The 3D printer is adapted to print at least part of the at least one first object onto the existing second object according to the pose and the alignment.

According to another aspect, there is disclosed a method for instructing a device communicating with a 3D printing system comprising a 3D printer provided with a printing coordinate system and adapted for printing at least one first object onto an existing second object, the method comprising providing or receiving an alignment between the at least one first object and at least part of the existing second object, providing or receiving an original position of the at least one first object in the printing coordinate system, the original position being a position at which at least part of the at least one first object is to be printed onto the existing second object, determining a spatial placement of the existing second object in the printing coordinate system according to the alignment and the original position of the at least one first object, and instructing the device to display a target area according to the determined spatial placement of the existing second object for placing the existing second object according to at least part of the displayed target area.

According to another aspect, there is provided a 3D printing system adapted for printing at least one first object onto an existing second object comprising a 3D printer provided with a printing coordinate system, a processing device adapted to determine or receive a spatial placement of the existing second object in the printing coordinate system, wherein the spatial placement of the existing second object is dependent upon an alignment between the at least one first object and at least part of the existing second object, and upon an original position of the at least one first object in the printing coordinate system, the original position being a position at which at least part of the at least one first object is to be printed onto the existing second object, a device adapted for communicating with the processing device and adapted to display a target area according to the spatial placement of the existing second object, and the 3D printer adapted to print at least part of the at least one first object onto the existing second object when the second object is placed according to at least part of the displayed target area.

According to another aspect, there is provided a computer program product comprising software code sections configured for performing the methods as described herein.

Thus, in order to enable a 3D printer to print at least one first object onto the desired surface area of an existing second object, the inventors found that one possible solution is to let the 3D printer know where the existing second object is located relative to the 3D printer in three dimensional space. For this aim, the present invention proposes, in a first aspect, to determine a pose between the 3D printer and the existing second object using one or more camera images and, in a second aspect, to instruct a device to illuminate a place where the existing second object has to be positioned according to the pre-determined alignment.

One application which could benefit from the present invention is to resume a 3D printing process of printing an object. When a printing process of printing an object from an input of a virtual model using a 3D printer is interrupted and the printed part of the object is moved away from the printer, resuming the printing process requires printing the remaining part of the object onto a desired area of the already printed part in order to build the complete object satisfying the input of the virtual model. In this example, the printed part of the object is an existing second object, the remaining part is one or more additional objects to be printed (the at least one first object), and the virtual model defines a pre-determined alignment between the printed part and the remaining part.

As used herein, the term "existing object" shall not be understood as being an intermediate object or product with a certain amount of layers in a continuous 3D printing process in which one layer after the other is deposited upon to form an object or product. Rather, "existing object" shall be understood as being, e.g., an object which, as a whole, is newly placed in the 3D printer for printing something additional onto it so that the position of the object has to be newly determined.

According to a further aspect, there is provided a method for instructing a 3D printing system comprising a 3D printer provided with a printing coordinate system to print at least one first object onto an existing second object comprising placing the existing second object or a part of the existing second object, capturing at least one image using at least one camera, the at least one image containing a first part of the 3D printer and at least part of the existing second object, and the first part of the 3D printer having a known spatial relationship relative to the printing coordinate system of the 3D printer, providing an alignment between at least part of the at least one object and at least part of the existing object, determining a pose of the existing object relative to the printing coordinate system according to the at least one image, and providing the 3D printing system with the pose and the alignment for the 3D printer to print at least part of the at least one first object onto at least part of the existing second object according to the pose and the alignment.

According to a further aspect, particularly useful when a camera is attached to the 3D printer, there is provided a method for instructing a 3D printing system comprising a 3D printer provided with a printing coordinate system to print at least one first object onto an existing second object comprising providing a pose of at least one camera relative to the printing coordinate system of the 3D printer, placing the existing second object or a part of the existing second object, capturing at least one image using the at least one camera, wherein the at least one image represents at least part of the existing second object, providing an alignment between at least part of the at least one first object and at least part of the existing second object, determining a pose of the existing second object relative to the printing coordinate system according to the at least one image, and providing the 3D printing system with the pose and the alignment for the 3D printer to print at least part of the at least one first object onto at least part of the existing second object according to the pose and the alignment. In this embodiment, there is no need to include a part of the 3D printer into the image.

According to a further aspect, there is provided a method for instructing a 3D printing system comprising a 3D printer provided with a printing coordinate system to print at least one first object onto an existing second object comprising providing a virtual model or an image of the existing second object or a part of the existing second object, providing an alignment between at least part of the at least one first object and at least part of the existing second object, and instructing a device, such as a display or projecting device, to display a target area according to the alignment for placing the existing second object according to at least part of the displayed target area. The existing second object may then be placed according to at least part of the target area.

In one embodiment, the 3D printer is an additive manufacturing based machine to make (or print) an object from a virtual model of the object through a sequential layering process. The shape of the printed model is determined at least partially according to the virtual model.

A virtual model of an object describes a geometrical shape property of the object. The virtual model could be 3D or 2D. The virtual model could also be an orthogonal or perspective 2D projection from a 3D model of the object. The perspective 2D projection may also be an image of the object captured by a camera. The virtual model may further contain texture information, e.g. textures or colors of surfaces of the object.

DETAILED DESCRIPTION OF THE INVENTION

FIGS. 2A to 2D show a respective 3D printing system respectively adapted for printing at least one first object onto an existing second object according to various embodiments of the invention. One embodiment of a 3D printer used for the purposes of the present invention may be a 3D printer 2A01 comprising a print head 2A03 and a printing platform 2A02. The 3D printer may move the print head and/or the printing platform to print an object. Material and/or binding material is deposited from the print head on the printing platform or a printed part of an object until a complete object has been printed or made. Such process is commonly known by the person skilled in the art and shall not be described in more detail for reasons of brevity.

Figure 2A:
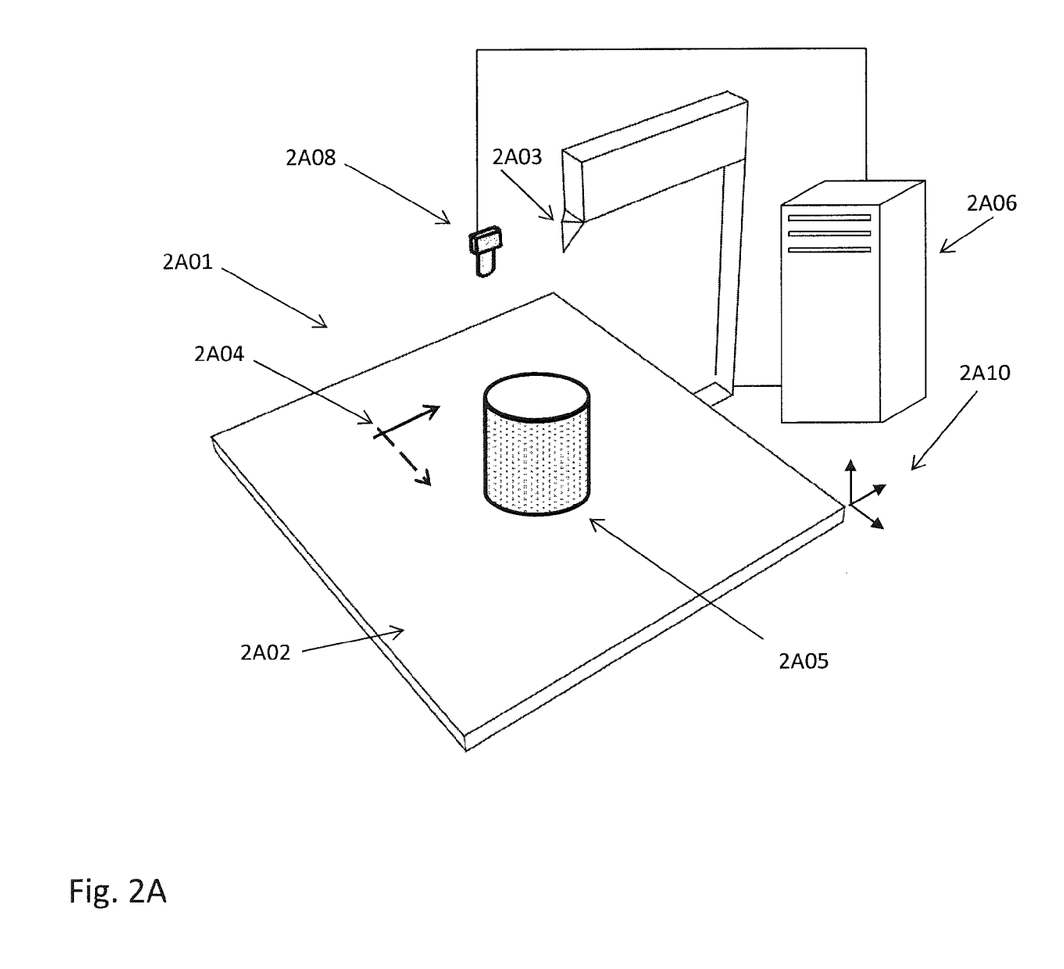
FIG. 2A shows a 3D printing system adapted for printing at least one first object onto an existing second object according to an embodiment of the invention, wherein the existing second object is a cup placed on a printing platform of a 3D printer.
Figure 2B:
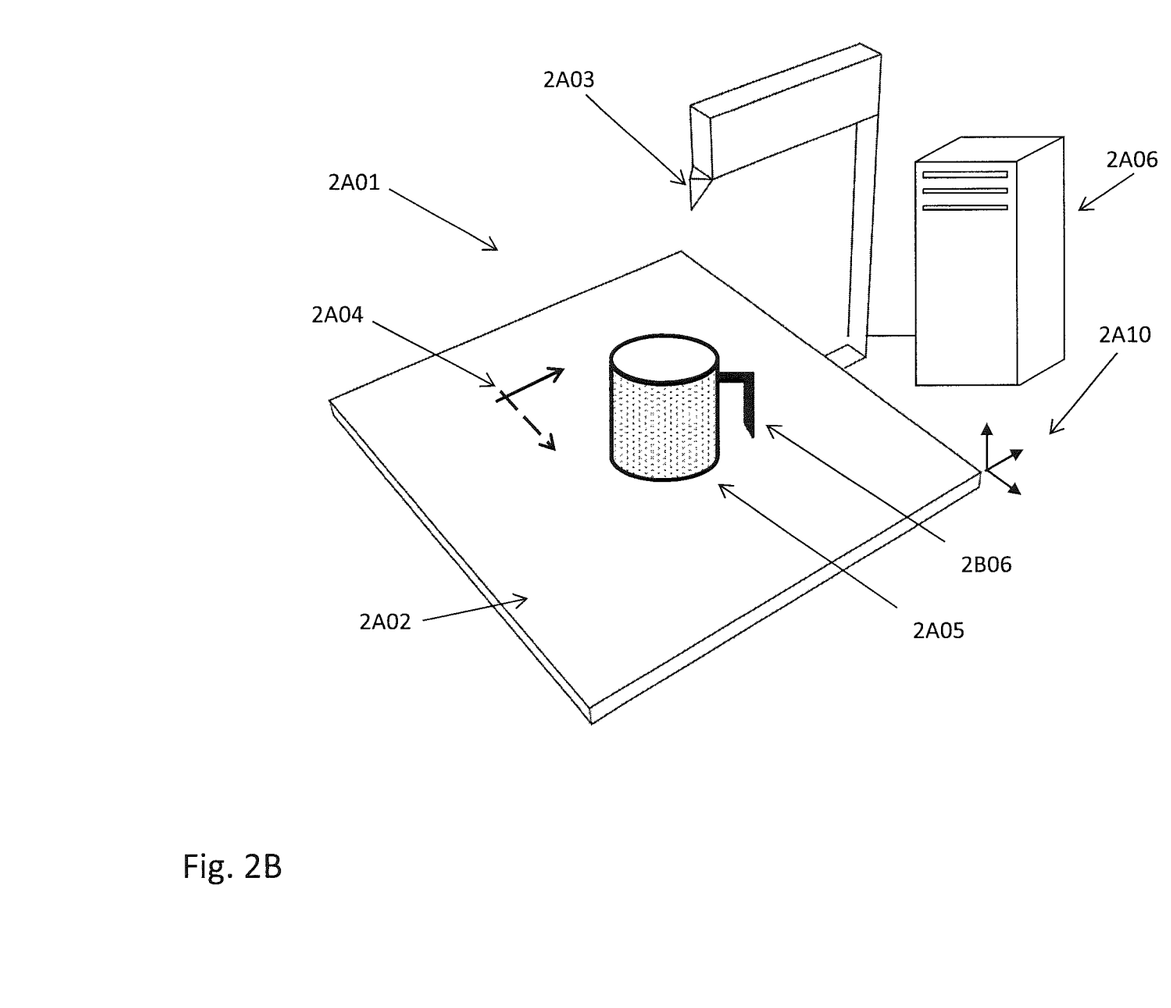
FIG. 2B shows a 3D printing system according to another embodiment of the invention, in which a handle is printed by the 3D printer onto an existing cup.

In terms of the present invention, the existing second object or the at least one first object could be, in principle, any type of real object. The real object is physical and tangible. The real object or a part of the real object may have a void or hollow in it, such as has a vase. The physical object or the part of the physical object may be rigid or resilient. For example, real cup 2A05 is an existing second object, which has been previously manufactured by any apparatus, and is (newly) placed in the 3D printer, and handle 2B06 is an at least one first object to be printed onto a surface of real cup 2A05 by printer 2A01. The printing area of the 3D printer is an area where the print head could reach to deposit material or a binding material.

The proposed invention can be generalized to be used with any device providing images of real objects. It is not restricted to cameras providing color images in the so-called RGB (red-green-blue) format. It can also be applied to any other color format and also to monochrome images, for example to cameras providing images in gray scale format. The camera may further provide an image with depth data. The depth data does not need to be provided in the same resolution as the (color/grayscale) image. A camera providing an image with depth data is often called RGB-D camera. A useful RGB-D camera system could be a time of flight (TOF) camera system. Kolb et al. in reference [7] give an overview on state of the art on time-of-flight camera sensors and applications.

The at least one camera used for the purposes of the invention could also be a structured light scanning device, which could capture the depth and surface information of real objects in a real world, for example using projected light patterns and a camera system. The at least one image may be a color image in the RGB format or any other color format, or a grayscale image. The at least one image may also further have depth data.

The printing coordinate system of the 3D printer defines a coordinate system for a 3D printing process of the 3D printer for printing an object. Components related to the 3D printing process, e.g. a print head or a part of it, have known positions in the printing coordinate system. A used printing platform or a part of the printing platform may also have a known position in the printing coordinate system. The position of the printed first object at its original position (i.e., no movements after the corresponding 3D printing process of printing the first object is complete) is known in the printing coordinate system.

The first part of the 3D printer is a visual or visible part, which may be directly connected or separated from the 3D printer.

For example, coordinate system 2A10 is a printing coordinate system of 3D printer 2A01, in which the positions of printer head 2A03, printing platform 2A02, and first part (designated by reference 2A04) of the 3D printer are known.

A "pose" as used herein shall be understood as is commonly known in the art. A pose has up to six degrees of freedom (DOF) which describe the position and orientation in 3D space. In 3D space, the position is defined by three translation parameters, e.g. displacements along three orthogonal axes, and the orientation may be defined by three Euler angle parameters. The orientation may also be represented in other math formulas, e.g. axis angle and quaternions. It is always possible to convert the math representations of the rotation to each other. A specific pose in the present invention could be determined by at least one of the inherent six parameters of the position and orientation in three dimensional spaces.

The alignment between at least part of the at least one first object and at least part of the existing second object as used herein may be a pose of the at least part of the at least one first object relative to the at least part of the existing second object. The alignment may also be a transformation between at least part of the at least one first object and at least part of the existing second object. The alignment may be manually determined. The alignment could also be determined automatically.

In the following embodiments of the invention will be further described in more detail.

In order to correctly make or print an object using a 3D printer, printing process related components of the 3D printer, e.g. print heads and printing platforms, have a known spatial relationship between each other. Thus, the components of the 3D printer could be defined in an arbitrary common coordinate system called printing coordinate system. A pose of the object to be printed of its original location (i.e. no movements occur relative to the 3D printer after the corresponding 3D printing process is complete) relative to the printing coordinate system is known.

In practice, there may be a need that an existing object be extended by adding additional objects onto it in order to build a composed object. In such case, there is a need to print at least one first object onto an existing second object to build a composed object using a 3D printer.

For example, a 3D printer could print a handle onto an existing cup to build a composed object of the cup with the handle. The handle may have to be printed at a desired place of the cup satisfying a design. The design defines a spatial alignment between the handle and the cup in the final composed object. The spatial alignment may only specify that the handle is attached to an outside surface of a side (i.e. not a bottom and top) of the cup. In this case, the handle could be attached to any area of the outside surface, but not to a specific location. The spatial alignment may specify that the handle has to be attached to a specific location of the outside surface of the cup in a specific pose. In this way, an alignment between at least part of the at least one first object (here: handle) and at least part of the existing second object (here: cup) may be determined.

The alignment may be determined by the 3D printing system or by a device which is separate from the 3D printing system, e.g. a mobile phone or any other type of processing device, such as a personal computer or tablet computer. If the alignment is determined by the separate device, the separate device could send the alignment to the 3D printing system via a cable, wirelessly or via a computer network.

In order to enable a 3D printer to print at least one first object onto a desired surface area of an existing second object or a part of the existing second object, one possible solution is to let the 3D printer know where the existing second object locates relative to a printing coordinate system of the 3D printer. For this, the present invention proposes to determine a pose of the existing second object in the printing coordinate system of the 3D printer using one or more images. The one or more images may be captured by a camera or multiple cameras. The one or multiple cameras may be held by users or rigidly attached to the 3D printer or somewhere else. The one or multiple cameras or a part of the cameras may be a component of the 3D printing system or coupled to the 3D printing system via cables or wirelessly, e.g. by Bluetooth technology.

The one or multiple cameras or a part of the cameras may be a component of a device which is separate from the 3D printing system, e.g. of a mobile phone or any other type of processing device, such as a personal computer or tablet computer. In this embodiment, the separate device could send the captured images to the 3D printing system via a cable, wirelessly, or via a computer network, and then the 3D printing system determines the pose of the existing second object in the printing coordinate system using the captured images.

It is also possible to determine the pose of the existing second object in the printing coordinate system using the captured images by means of the separate device, and then the separate device sends the pose of the existing second object to the 3D printing system.

As soon as the pose and the alignment are provided to the 3D printing system, the 3D printer is capable to print the at least one first object onto the existing second object according to the pose and the alignment. The 3D printing system may be instructed accordingly, e.g. by communicating appropriately with the separate device, e.g. mobile phone. According to an embodiment, the printing process will only start after the pose and the alignment are available in the 3D printing system. For example, it will start pursuant to sending the data and, e.g., a command given by a user, e.g. by pressing a button.

The images may be color images in the RGB format or any other color format, or grayscale images. The images may also further have depth data. The depth data does not need to be provided in the same resolution as the (color/grayscale) image.

The existing second object or a part of the existing second object should be placed within a printing space of the 3D printer such that the 3D printer could print at least one first object onto the existing second object. For example, a print head of the 3D printer would be able to deposit materials or binding materials onto the existing second object or a part of the existing second object. The 3D printer could be equipped with more than one print heads.

Figure 3:
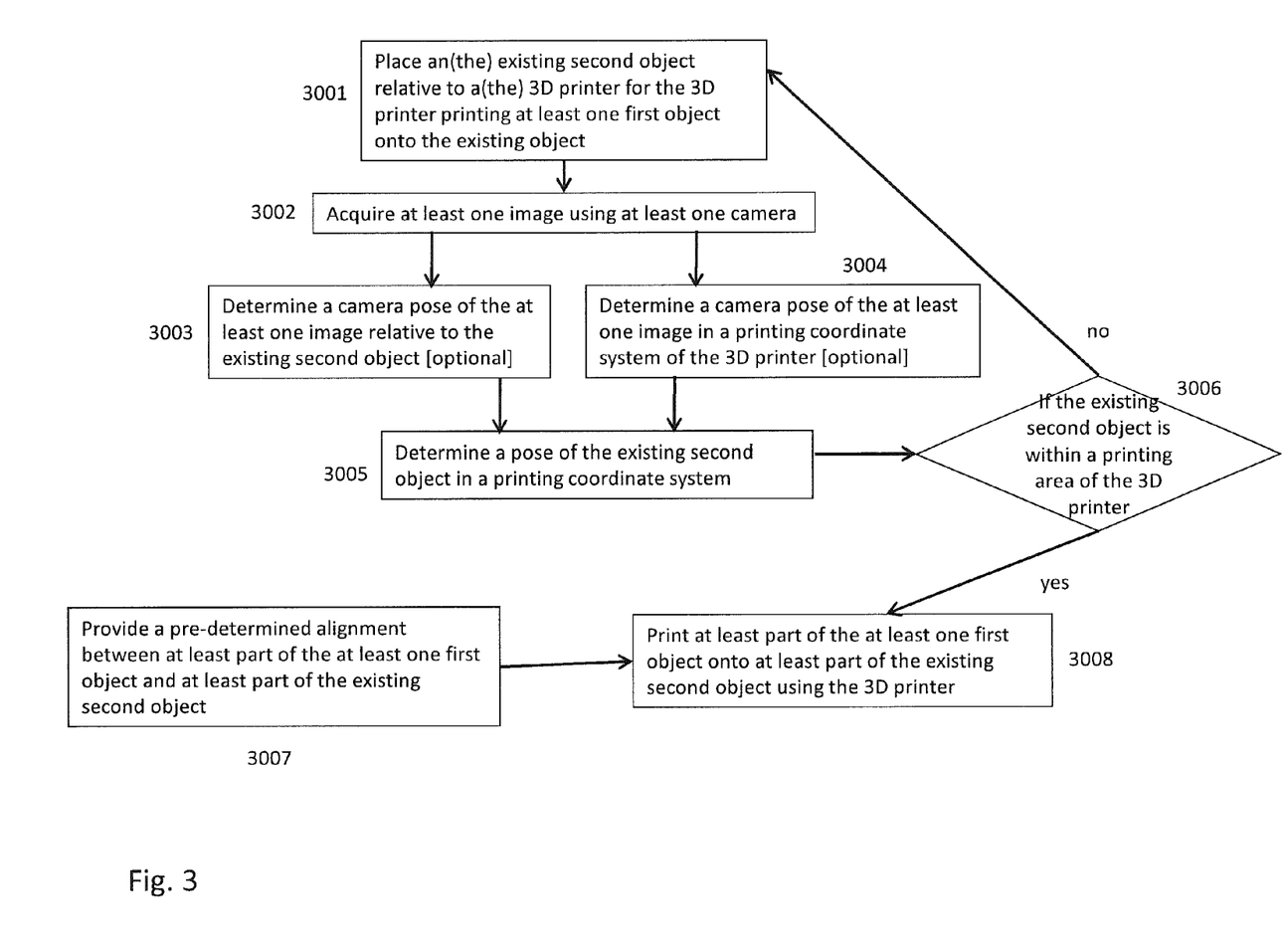
FIG. 3 shows a flowchart of a method of printing at least one first object onto an existing second object using a 3D printer according to an embodiment of the invention.

FIG. 3 shows a flowchart of a method according to an embodiment of the present invention.

An existing second object is placed relative to a 3D printer for the 3D printer printing at least one first object onto the existing second object (step 3001). Then, at least one image is captured by at least one camera (step 3002). The captured at least one image may contain a first part of the 3D printer, at least part of the existing second object, or both. For further details, it is referred to embodiments described below. Afterwards, optionally, a camera pose of the camera capturing the at least one image relative to the existing second object is determined (step 3003) and a camera pose of the camera capturing the at least one image in the printing coordinate system of the 3D printer is determined (step 3004). Then, a pose of the existing second object in the printing coordinate system is determined (step 3005). Having the determined pose of the existing second object, it is possible to check if the existing second object is within a printing area of the 3D printer (step 3006). If the existing second object is not within the printing area, then the existing second object should be moved relative to the 3D printer (step 3001), and the process beginning with step 3001 starts again. It may be necessary to provide a predetermined alignment between at least part of the at least one first object and at least part of the existing second object (step 3007). Finally, the 3D printer prints at least part of the at least one first object onto at least part of the existing second object according to the alignment and the pose of the existing object (step 3008).

The way of defining or determining the alignment between at least part of the at least one first object and at least part of the existing second object may be manually or automatically. A user may manually define the alignment between the at least part of the at least one first object and the at least part of the existing second object. For this, the user, e.g., could manipulate a virtual model of the at least one first object and a virtual model of the existing second object in order to adjust their spatial relationship with visual feedback in a 3D animation software. The virtual model of the at least one first object is normally available, as the 3D printer needs the virtual model to print the at least one first object.

The virtual model of the existing second object may be known or computed from one or more images, e.g. taken by a camera. The virtual model may be a perspective projection of the existing second object or a part of the existing second object, for example obtained from an image captured by a camera. The virtual model may describe a 3D shape of the existing second object. The 3D shape could be computed from two images of the existing second object captured by cameras. The 3D shape may be computed based on a fundamental matrix relating corresponding points in the two images and a triangulation method. The 3D shape may also be obtained from an image with depth data.

An aspect of the present invention is to enable the 3D printer to print the at least one first object onto a desired place of the existing second object by determining a pose $P_o$ of the existing second object in the printing coordinate system of the 3D printer using at least one image, e.g. captured by at least one camera.

The pose $P_o$ may be estimated by using an image, e.g. a first image captured by a camera. In one embodiment, pose $P_o$ could be determined from a camera pose $P_{c1p}$ of the first image in the printing coordinate system and camera pose $P_{c1e}$ of the first image relative to the existing second object. Camera pose $P_{c1p}$ and/or camera pose $P_{c1e}$ can be determined by using various computer vision methods based on the first image. In another embodiment, pose $P_o$ may be determined from the first image without explicitly computing camera pose $P_{c1p}$ and/or camera pose $P_{c1e}$.

It may be necessary to determine camera pose $P_{c1p}$ of the first image in the printing coordinate system.

When the first image contains a first part of the 3D printer, camera pose $P_{c1p}$ could be computed based on the first image. The first part of the 3D printer has a spatial relationship (i.e. pose, denoted by $P_{first}$) relative to the printing coordinate system. $P_{first}$ may be pre-known or estimated. The first part of the 3D printer may also have a known virtual model or a known geometrical size. Various computer vision algorithms could be employed to compute camera pose $P_{c11}$ of the first image relative to the first part of the 3D printer according to the first image. For example, having known intrinsic parameters of the camera, at least three correspondences between three image points and three real points of the first part of the 3D printer are sufficient to compute pose $P_{c11}$ for 6 DOF. Then camera pose $P_{c1p}$ could be determined according to pose $P_{first}$ and pose $P_{c11}$.

The first part of the 3D printer may be attached to the 3D printer during manufacturing of the 3D printer or afterwards. In this case, pose $P_{first}$ could be known from the mechanical design or the manufacturing of the 3D printer. The first part of the 3D printer could also be attached to an arbitrary place relative to the 3D printer after the 3D printer is manufactured. In this situation, pose $P_{first}$ could be estimated manually using measurement gauges, e.g. rulers, or using computer vision based calibrations. A computer vision based calibration for computing pose $P_{first}$ may comprise printing an object from a virtual model by the 3D printer, and using a camera to capture an image of the first part of the 3D printer and at least part of the printed object. Camera poses relative to the first part of the 3D printer and relative to the printed object could be computed respectively based on feature correspondences or their virtual models. As the printed object could have a known position in the printing coordinate system, pose $P_{first}$ is estimated according to the camera pose relative to the first part of the 3D printer and the camera pose relative to the printed object.

When a virtual model of the 3D printer is known, pose $P_{c1p}$ can be realized based on feature correspondences between the virtual model and the first image or matching 2D projection of the virtual model to the image. If the first image has depth data, pose $P_{c1p}$ could also be determined by matching a surface data set from the model and another surface data set of the 3D printer from the first image.

The camera pose ($P_{c1p}$) of the first image in the printing coordinate system of the 3D printer could also be determined if the camera is fixed at a position known in the printing coordinate system. For example, camera 2C08 is fixed to 3D printer 2A01 near to print head 2A03 (see FIG. 2C). The camera could also be mounted to a movable part of the 3D printer, in which the movable part could move to a known position in the printing coordinate system of the 3D printer. It is possible to calibrate a pose of the camera 2C08 fixed to a part of the 3D printer in the printing coordinate system 2A10. In order to calibrate the pose, the fixed camera could capture an image of a printed object printed by the 3D printer. A camera pose relative to the printed object can be determined according to the captured image and a virtual model of the printed object. As the printed object has a known position in the printing coordinate system, the pose could be computed. Calibration of the pose of the fixed camera may also be realized by using the camera to capture an image of one or more visual markers (fiducials) at known positions relative to the 3D printer (e.g. in the printing coordinate system). Camera pose $P_{c1p}$ of the first image in the printing coordinate system could be directly obtained, if the first image is captured by the camera fixed to the 3D printer.

The camera may be fixed to an end effector of a mechanical arm. A base of the arm is fixed to the position known in the printing coordinate system. The arm would provide the position of the end effector to the base.

In another example, a tracking system, e.g. optical tracking or magnetic tracking system, is used to compute poses of the camera in the printing coordinate system. This may require attaching some fiducials to the camera and the 3D printer and first compute poses of the camera and the 3D printer in a common tracking coordinate system of the tracking system.

It might be necessary to determine camera pose $P_{c1e}$ of the first image relative to the existing object.

When a virtual model of the existing second object or a part of the existing second object is known, a camera pose relative to the existing second object could be computed from an image containing the existing second object or the part of the existing second object. Thus, when the first image contains the existing second object or a part of the existing second object that has a virtual model, pose $P_{c1e}$ can be realized based on feature (e.g. points or edges) correspondences between the model and the first image or matching 2D projection of the virtual model to the image. If the first image has associated depth data, pose $P_{c1e}$ could also be determined by matching a surface data set from the model with another surface data set from the first image.

It is also possible to rigidly attach a visual marker at a fixed known location relative to the existing second object. Determining camera pose $P_{c1e}$ could be realized by determining the camera pose of the first image relative to the visual marker. For this, the first image has to contain the visual marker.

The first image may be captured by a camera that is fixed at a position known with respect to the existing second object. In that case, pose $P_{c1e}$ could be obtained from the known camera position.

It is also possible to determine pose $P_o$ from the first image without explicitly computing camera pose $P_{c1p}$ and camera pose $P_{c1e}$. Pose $P_o$ may be estimated from a translation and a rotation between the first part of the 3D printer and the existing second object in a 2D image coordinate system of the first image. For example, an existing second object, such as 2D paper 1A01, is placed on a planar printing platform 2A02 of 3D printer 2A01 (see FIG. 2C). The planar printing platform has a known position in the printing coordinate system 2A10. In this case, determining pose $P_o$ only needs to compute an on-plane rotation and translation of the existing second object relative to the printing platform. Computing the on-plane rotation and translation could be based on a translation and rotation between the first part of the 3D printer and the existing second object in the image coordinate system of the first image. This may be realized based on pixel locations of one or more parts of the existing second object in the first image. The one or more parts are on the same plane level as the plane of the printing platform, i.e. the one or more parts have a zero distance to the printing platform along the normal of the printing platform. The translation and rotation in the image coordinate system of the first image may have perspective effects, i.e. the image plane of the camera capturing the first image is not parallel to the plane of the printing platform. Determining the on-plane rotations and translations requires rectifying the first image or knowing a homography for the perspective transformation, when the first image has the perspective effects. For the rectifying and converting pixel measurements to metric measurements, plane parameters (i.e. normal and distance to the camera of the first image) of the printing platform are needed, see reference [4]. The plane parameters can be computed from a planar reference in the first image. For example, reference 2A04 on printing platform 2A02 could be used as a planar reference. Reference 2A04 has a known geometry and known position relative to 3D printer 2A01 or printing coordinate system 2A10 and, thus, may serve to designate a first part of the 3D printer.

The pose $P_o$ may be estimated by using multiple images, for example using a first image and a second image captured by cameras.

It is also possible to reconstruct a 3D shape of the existing second object or a part of the existing second object from at least two images captured by cameras. For the 3D reconstruction, the at least two images have to be captured at different camera positions when the images have no depth information. The at least two images may be captured by one camera or different cameras. The at least two images are a first image and a second image. The 3D shape may be reconstructed based on triangulation according to the first image and the second image. Triangulation refers to the process of determining the position of a feature in 3D space given its projections (image features) onto two, or more, images.

For the triangulation, the camera pose of the first image and the camera pose of the second image in one common coordinate system is needed. The common coordinate system could be the printing coordinate system or a coordinate system of the camera of the first image or the second image. Several different embodiments of determining a camera pose of an image in the printing coordinate system are proposed by the present invention. In order to estimate the camera poses of the first and second images in the printing coordinate system, the first and second images capture a first part and a second part of the 3D printer that have known poses in the printing coordinate system respectively. The first part and the second part may be a same part or two different parts. The first and second images may be captured by a same camera or different cameras. If the images are captured by a camera mounted to a movable part of the 3D printer and the movable part could move to a known position, the camera pose of the first image and the camera pose of the second image in one common coordinate system could be directly obtained. The camera capturing the images could also be mounted to a movable part of a mechanical arm, which could provide a motion of the movable part.

The reconstructed 3D shape of the existing or the part of the existing second object can be used to define the alignment between the at least one first object and the existing second object.

Having known camera poses of the first image and the second image in the printing coordinate system for reconstructing the 3D shape of the existing second object, the reconstructed 3D shape may be directly related to the printing coordinate system. Thus, pose $P_o$ of the existing second object in the printing coordinate system is obtained.

In addition to the components as mentioned above, the 3D printing system according to FIGS. 2A to 2D comprises, in addition to the 3D printer 2A01, a processing device 2A06 (such as a microcomputer of any type, e.g. a mobile phone, or a tablet computer) which is coupled and adapted to receive at least one image captured by a camera 2A08 (FIG. 2A) or camera 2C08 (FIG. 2C), with the captured image containing one or more of the objects as mentioned above. The processing device 2A06 is adapted to determine an alignment between at least part of the at least one first object and at least part of the existing second object as described above, and is further adapted to determine a pose of the existing second object relative to the printing coordinate system according to the received at least one image. The processing device 2A06 is adapted to communicate with the 3D printer with, e.g., its printer head 2A03 accordingly for sending the information as described herein. It may also control the 3D printer if appropriate in the particular application.

For enabling a 3D printing system comprising a 3D printer to print at least one first object onto a desired surface area of an existing second object or a part of the existing second object according to an alignment between the at least one first object and the existing second object, another aspect of the invention proposes to instruct a device, such as a projector or a display, e.g. of a mobile device, to illuminate or display a target area indicating where the existing second object should be positioned in order for the at least one first object to be printed onto the existing second object.

An original position of an object to be printed by the 3D printer is defined by a pose relative to a printing coordinate system of the 3D printer, at which the object to be printed is located, without movements having occurred after the corresponding 3D printing process for printing the object has completed. The original position of the object to be printed could be arbitrary within a valid range and is known in the printing coordinate system. The valid range is defined by working space of the print heads of the 3D printer.

According to the invention, the alignment between the at least one first object and at least part of the existing second object could determine a spatial placement of the existing second object in the printing coordinate system (i.e. a position and orientation of the existing second object in the printing coordinate system) according to the original position of the at least one first object to be printed. The existing second object may be required to be placed on the printing platform. In this case, an orthogonal projection of the existing second object at the determined spatial placement to the printing platform defines a target area on the printing platform where the existing second object should be positioned for printing the at least one first object onto a desired surface of the existing second object. The spatial placement of the existing second object in the printing coordinate system may be determined by the 3D printing system. For this, the alignment and the original position of the at least one first object have to be provided to or determined by the 3D printing system.

An illumination of a target area may be realized by embedding light sources, e.g. LED (light emitting diode), into the printing platform. The illumination of the area may also be realized by using a projector to project a pattern or some visual effects. Particularly with using the projector, the projected pattern or visual effects may be visible on a surface of the existing second object. The pattern or visual effects could facilitate to adjust the placement of the existing second object, e.g. by aligning an edge of the existing second object with a corresponding edge of the pattern. The projector may be a component of the 3D printing system or coupled to the 3D printing system via cables or wirelessly, e.g. by Bluetooth. It might be necessary to have a known projector position in the printing coordinate system in order to project the pattern or visual effects onto the area. The projector could be fixed relative to the printing coordinate system and has known position in the printing coordinate system.

Another way of displaying a target area where the existing second object should be positioned is to highlight or illuminate the area in an image or a live video containing the area captured by a camera. Highlighting or illumination could be realized by overlaying a computer-generated image with the target area in the captured image or live video. In this case, a camera that provides a live video can support a user placing the existing second object into the area, as the live video provides a real-time visual feedback where the existing second object resides relative to the area. The camera may be a component of the 3D printing system or coupled to the 3D printing system via cables or wirelessly, e.g. by Bluetooth. It might be necessary to have a known camera position in the printing coordinate system in order to overlay the real-time visual feedback onto the image or the live video of the camera. The camera could be fixed relative to the printing coordinate system and has a known position in the printing coordinate system.

The spatial placement of the existing second object in the printing coordinate system may be determined by a separate device, e.g. a mobile phone or tablet computer. For this, the alignment and the original position of the at least one first object have to be provided to or determined by the separate device. Further, the separate device could be equipped with a camera and a display showing the target area as an area highlighted by computer generated visual information in an image or a live video captured by the camera. The position of the camera of the separate device relative to the printing coordinate system could be computed based on an image captured by the camera. The methods proposed above could be applied.

The separate device could also be equipped with a projector projecting a pattern or some visual effects onto the target area. To compute the position of the projector, a camera could be fixed relative to the projector with a known relative transformation between the camera and the projector. The camera could be used to capture images in order to compute the position of the projector.

Figure 2C:
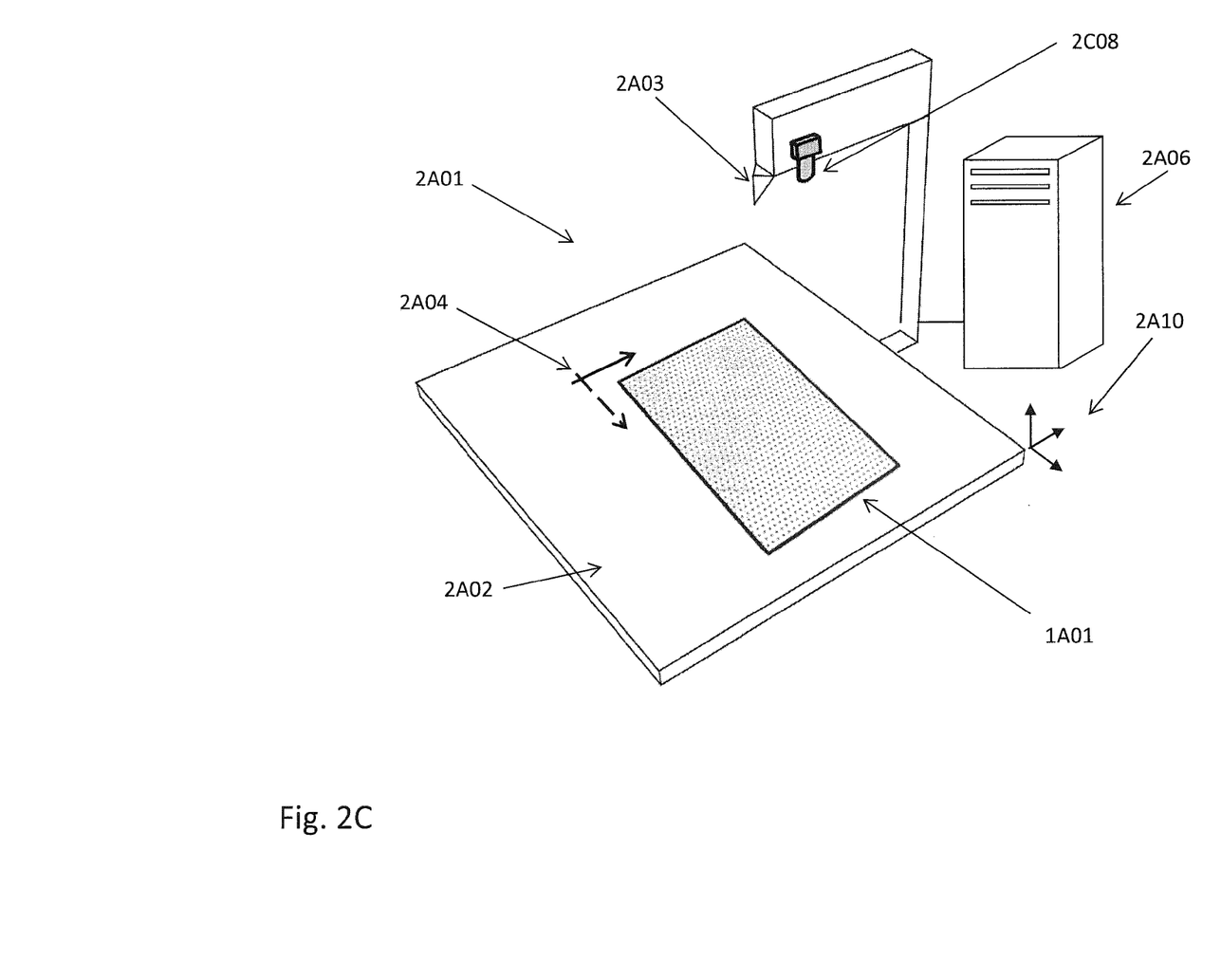
FIG. 2C shows a 3D printing system according to another embodiment of the invention, in which a 2D paper is placed on a printing platform of a 3D printer.
Figure 2D:
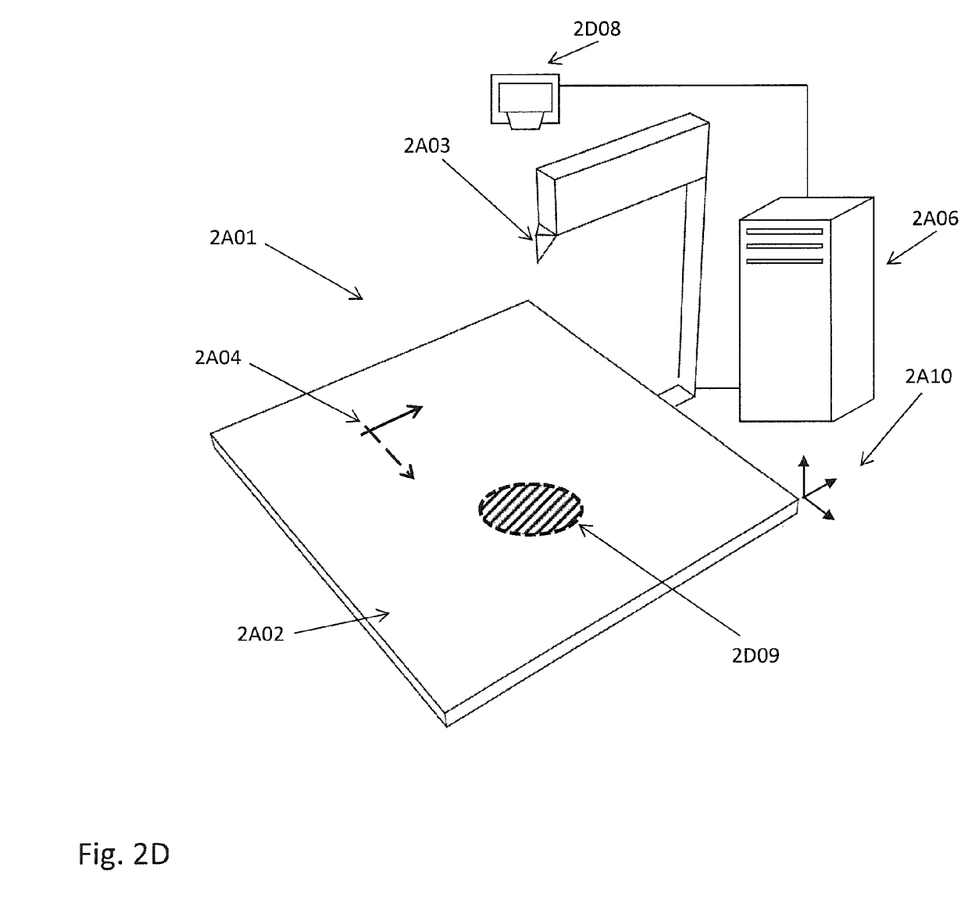
FIG. 2D shows a 3D printing system according to another embodiment of the invention, in which an area is illuminated visually on a printing platform.

In this regard, FIG. 2D shows a 3D printing system comprising a 3D printer 2A01, in which a processing device 2A06 is coupled to the 3D printer 2A01. The processing device is adapted to determine the spatial placement of the existing second object in the printing coordinate system. The processing device could be a mobile device, such as a mobile phone or tablet computer. The spatial placement of the existing second object is dependent upon an alignment between the at least one first object and at least part of the existing second object and upon an original position of the at least one first object in the printing coordinate system 2A10. As mentioned above, the original position is a position at which at least part of the at least one first object is to be printed onto the existing second object. A device 2D08, such as a projector, is coupled to or communicates with (e.g. direct communication via wireless or cable connection, or indirect communication through a server) the processing device and adapted to display a target area according to the spatial placement of the existing second object. When the existing second object is placed according to at least part of the displayed target area 2D09, the 3D printer may print the at least one first object onto the existing second object.

Figure 4:
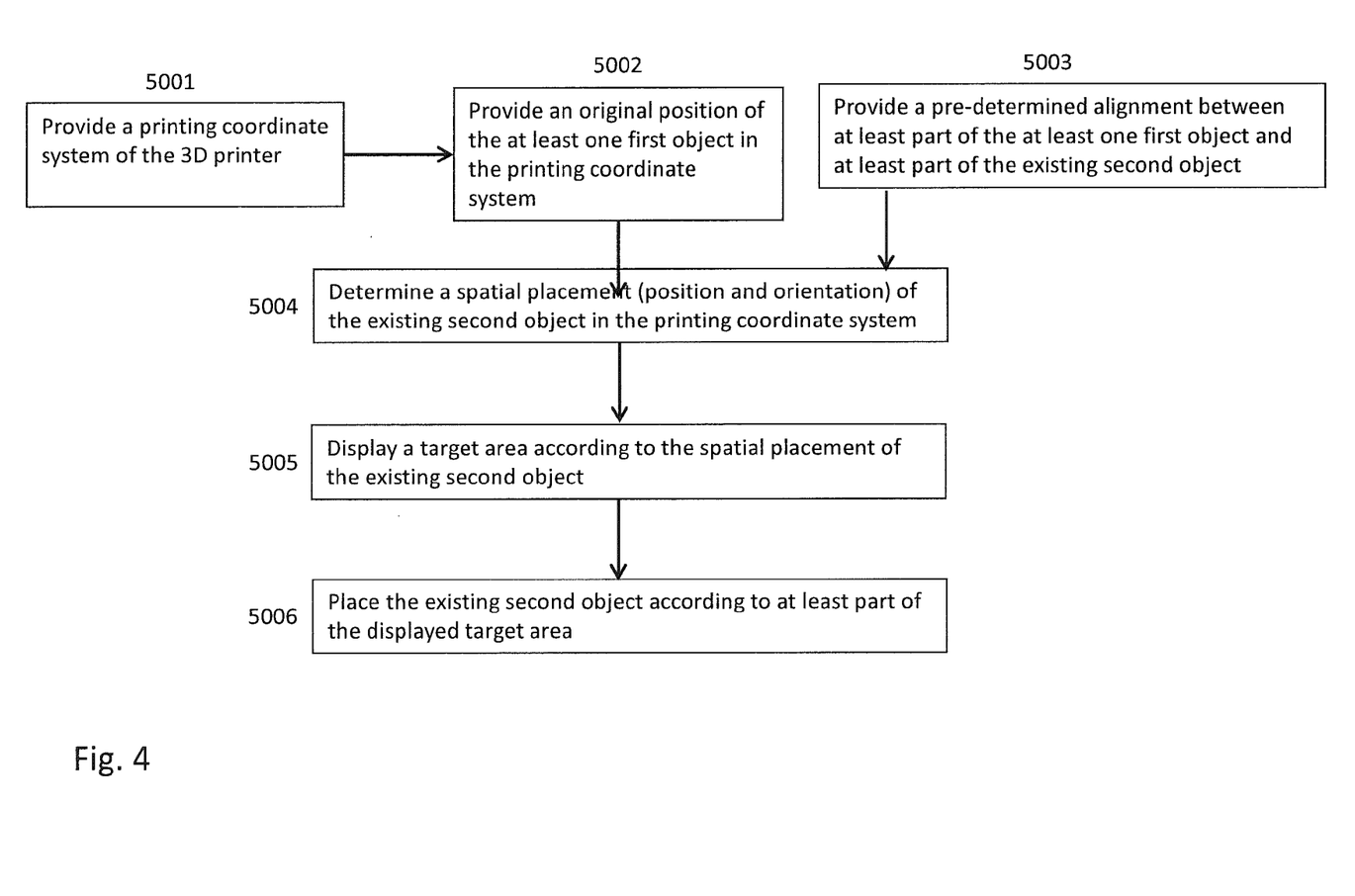
FIG. 4 shows a flowchart of a method of printing at least one first object onto an existing second object using a 3D printer according to another embodiment of the invention.

FIG. 4 shows a flowchart of a method of printing at least one first object onto an existing second object using a 3D printer according to another embodiment of the invention illuminating an area indicating where the existing second object should be positioned. In step 5001, a printing coordinate system of the 3D printer is provided, as described above. According to step 5002, an original position of the at least one first object in the printing coordinate system is provided. The original position is a position at which at least part of the at least one first object is to be printed onto the existing second object, see for example below description of how the handle to be printed onto the cup is positioned. Further, a pre-determined alignment between at least part of the at least one first object and at least part of the existing second object is provided, e.g. an alignment between handle and cup (step 5003). In the following step 5004, a spatial placement (position and orientation) of the existing second object in the printing coordinate system is determined. Then, in step 5005, a target area according to the spatial placement of the existing second object is displayed. In step 5006, the existing second object is placed according to at least part of the displayed target area, and at least part of the at least one first object may be printed onto the thus placed existing second object.

A possible application of printing a first object onto an existing second object using a 3D printer is printing one or more 3D physical models of an environment onto a 2D map or blueprint of the environment in order to extend the 2D map or blueprint with the 3D physical model. Potential examples include printing physical models of buildings or trees on a 2D blueprint of an outdoor environment, and printing physical models of furniture on a 2D blueprint of a room or office. The physical models of buildings, trees or furniture may have to be printed at desired places onto the 2D blueprints in order to represent a realistic or planed case, e.g. for room planning.

Figure 1A:
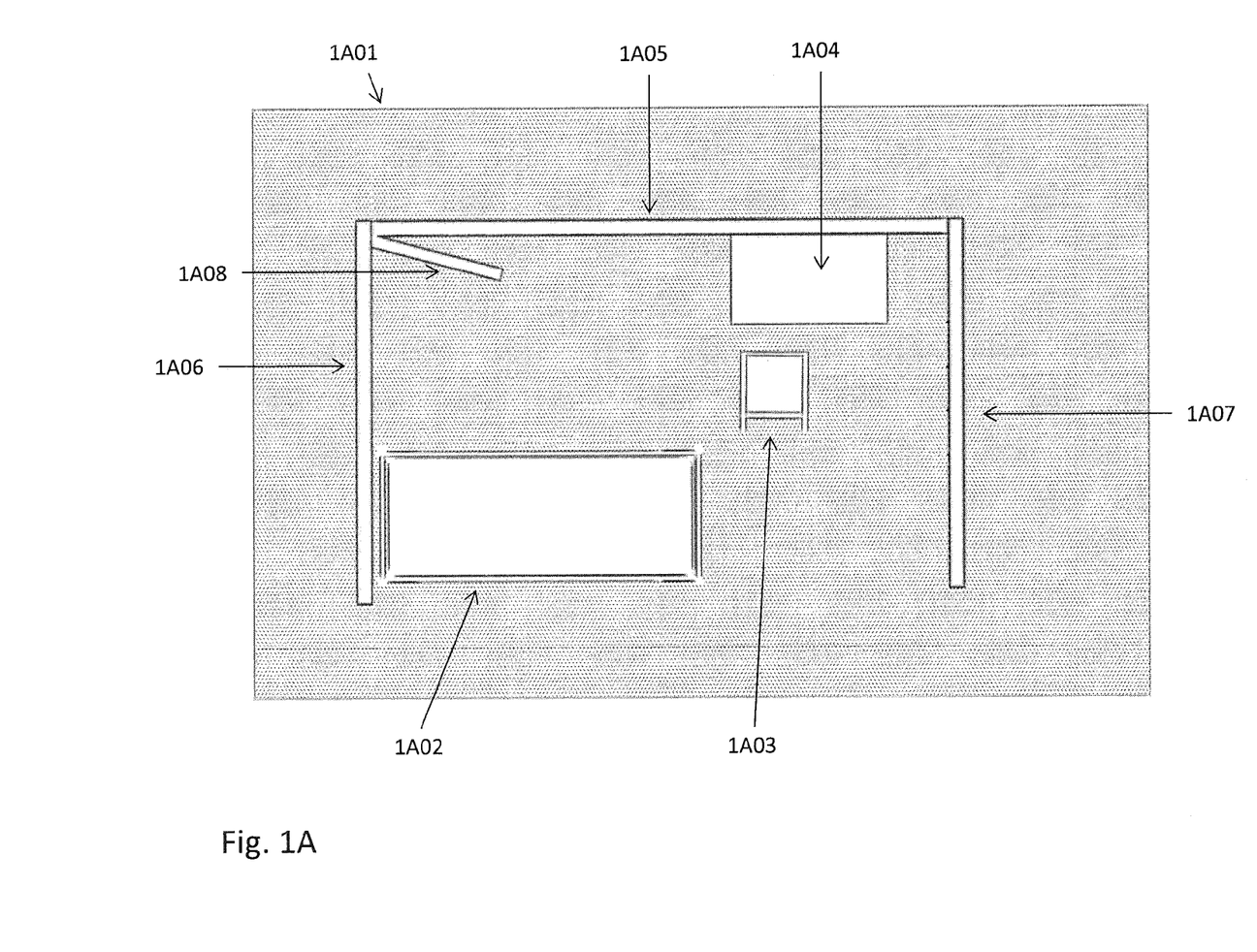
FIG. 1A shows, as a possible embodiment of the invention, a 2D blueprint of a room planning.
Figure 1B:
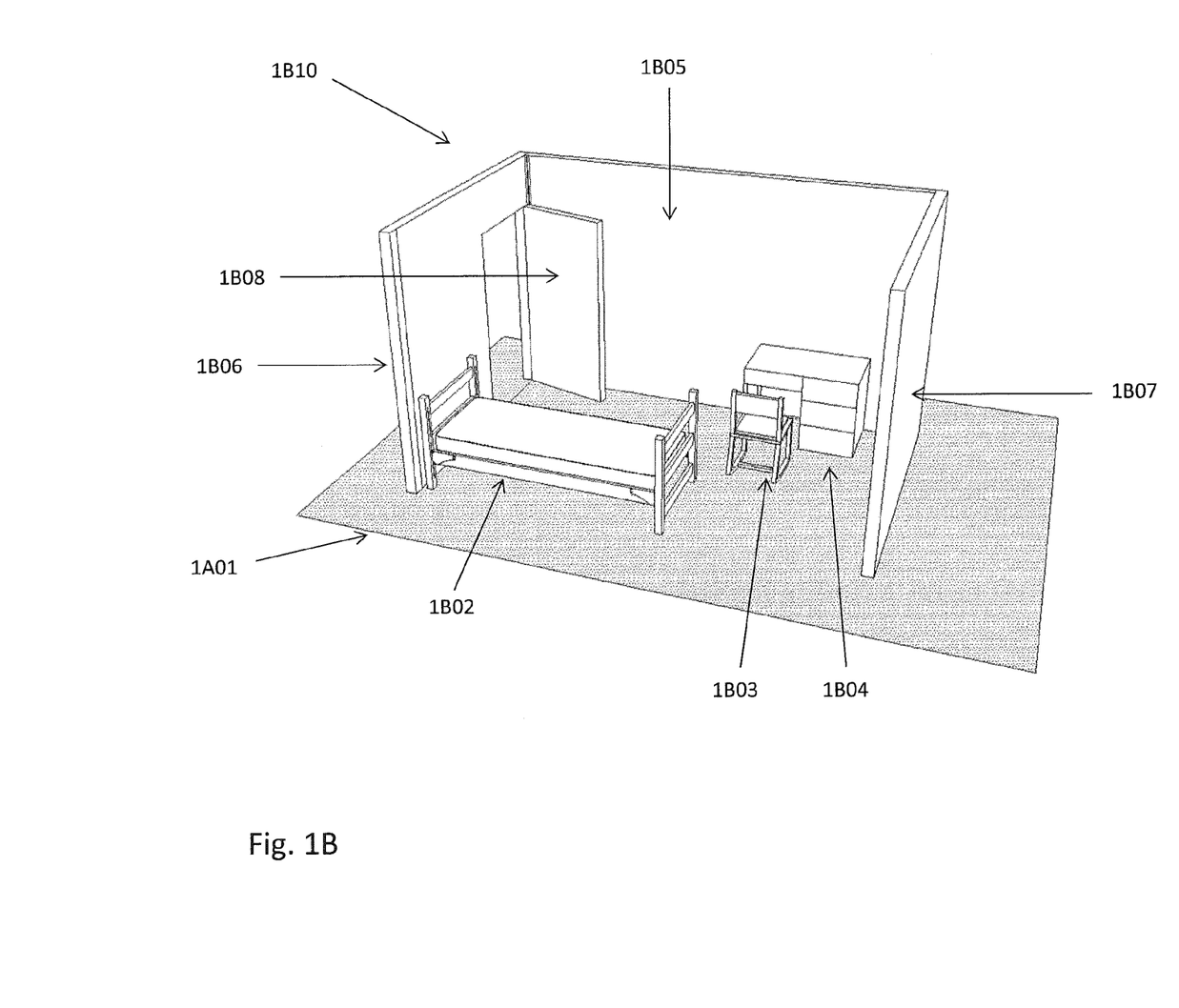
FIG. 1B shows, as a possible embodiment of the invention, objects such as physical models of furniture printed by a 3D printer on the 2D blueprint shown in FIG. 1A.

In this regard, FIG. 1A shows an existing second object being a 2D paper (denoted by 1A01) of a room planning having positions of 3 walls 1A05, 1A06, and 1A07, a door position 1A08, a bed position 1A02, a chair position 1A03, and a desk position 1A04. It is possible to create 3D physical model 1B10 of the room planning by using a 3D printer to make or print physical objects of walls 1B05, 1B06, and 1B07, door 1B08, bed 1B02, chair 1B03, and desk 1B04 onto desired places of existing 2D paper 1A01, as depicted in FIG. 1B. For the printing, virtual models of 1B05, 1B06, 1B07, 1B08, 1B02, 1B03, and 1B04 are provided to the 3D printer. For demonstration purposes, a fourth wall of the room is not drawn and created in 2D paper 1A01 and 3D physical model 1B10.

Alignments between existing paper 1A01 and each of printed physical objects 1B05, 1B06, 1B07, 1B08, 1B02, 1B03, and 1B04 define their spatial relationships in 3D physical model 1B10 of the room planning. The alignments may be provided automatically by analyzing the drawings of paper 1A01, e.g. detecting the desk position 1A04 in existing paper 1A01. The alignments may also be provided manually, for example by dragging and dropping virtual models of the physical objects to be printed relative to a virtual model of existing paper 1A01, e.g. in a 3D animation program. The virtual model of existing paper 1A01 could be a digital drawing of existing paper 1A01, which may be a scan or an image of existing paper 1A01 captured by a camera. For example, an image of existing paper 1A01 that is placed on printing platform 2A02 captured by camera 2C08 could be used as a digital virtual model of existing paper 1A01 (see FIG. 2C). In one embodiment of providing an alignment, a user could drag and drop a virtual model of chair 1B03 to position 1A03 of the digital drawing of existing paper 1A01 in order to provide the alignment between existing paper 1A01 and physical object 1B03 to be printed. Furthermore, the image captured by camera 2C08 could also be used to determine a pose of existing paper 1A01 relative to printing coordinate system 2A10 of 3D printer 2A01.

After an initial placement of the existing paper on the printing platform, an image of a first part (designated by reference 2A04) of the 3D printer and the existing paper is captured by a camera. A pose of the existing paper in printing coordinate system 2A10 could be determined according to the image. As the existing paper is placed on the printing platform, the pose could be determined according to a 2 DOF translation and 1 DOF rotation on the plane of the printing platform. The position of camera 2C08 rigidly mounted to the 3D printer could be pre-calibrated in the printing coordinate system, e.g. in an off-line calibration (before the actual printing process). In case that camera 2C08 is used to capture an image for determining the pose of the existing paper relative to the printing coordinate system, the image has to include at least part of the existing paper, but the first part (reference 2A04) of the 3D printer is not necessary to be included in the image.

The determined pose of the existing paper may indicate that the existing paper is not placed within a printing area of the 3D printer. In this case, the existing paper has to be re-placed relative to the 3D printer and another pose of the existing paper has to be determined for the re-placed position. This may be repeated until the existing paper is placed within the printing area.

If existing paper 1A01 is within the printing area, the 3D printer may print physical objects 1B05, 1B06, 1B07, 1B08, 1B02, 1B03, and 1B04 onto the existing paper, which extends the 2D existing paper to 3D physical model 1B01 of the room planning.

Another illustrative example of printing objects onto an existing object using a 3D printer is to print or make a handle onto an existing cup for enhancing usability of the existing cup.

In this regard, FIG. 2A shows that a cup 2A05 is placed on a printing platform 2A02 of 3D printer 2A01 for printing or making a handle on an outer surface of the cup by using the 3D printer. FIG. 2B shows the completed object with handle 2B06 printed on the outer surface of the cup 2A05.

A pre-determined alignment between the handle and the cup may be provided to determine where the handle is to be created on the cup. In this example, the pre-determined alignment defines that the handle has to be created on the outer surface of the cup, or even in a particular area on the outer surface. The alignment may be manually defined in a 3D animation software by manipulating a spatial relationship between virtual models of the handle and the cup. The virtual model of the handle is normally available to the processing device and 3D printer, respectively, as the 3D printer would need it for printing a physical object from its virtual model. The virtual model of the cup may be pre-known or known from a reconstruction using at least two camera images. The virtual model of the cup may also be generated from a camera image with depth information.

In order to determine a pose of cup 2A05 placed on printing platform 2A02 in printing coordinate system 2A10 of 3D printer 2A01 (see FIG. 2A), a camera 2A08 could be employed to capture an image of a first part (reference 2A04) of the 3D printer and the cup. Several computer vision methods could be used to determine the pose based on the image, for example based on model based matching when a virtual model of the cup is available. In case that a camera is used to capture an image for determining the pose, the cup has to be included in the image, but the first part (reference 2A04) of the 3D printer is not necessary to be included in the image.

If cup 2A05 is within a printing area of 3D printer 2A01, the 3D printer could print handle 2B06 onto the cup according to the pre-determined alignment and the pose of the cup. This 3D printing physically extends the cup by a handle.

In order to print handle 2B06 onto a desired place of cup 2A05 using 3D printer 2A01, it is also possible to illuminate an area on which the cup has to be placed on the printing platform. A position of the final printed handle in the printing coordinate system is known by the 3D printer, as the 3D printer could decide where to print the handle. Thus, the 3D printer could define a preferred position of the final printed handle. Having the pre-determined alignment between the handle and the cup and the preferred position of the final printed handle, a desired position where the cup has to be placed in the printing coordinate system can be determined. Then, the intersection between the cup at the desired position and the printing platform defines an area. As a position of the final printed handle could be arbitrarily defined by the 3D printer theoretically, it is possible to choose a position in which the cup has to be placed on the printing platform, e.g. area 2D09 on printing platform 2A02. FIG. 2D shows that area 2D09 is illuminated visually on printing platform 2A02, e.g. by a projector 2D08. In principle, the illumination of area 2D09 may be realized by light sources embedded in the platform or using a projector to project a pattern onto the platform.

There may exist collisions between existing objects or printed objects and a movable part of a 3D printer (e.g. printer head) during a printing process. Cameras may also be employed to detect or predict the collisions.

A 3D printer could print or produce a real object, which is physical and tangible, from a virtual model of the object. Surface texture of the printed object is depending on materials used by the printer for printing. The surface texture of the printed object cannot be physically changed or modified after the object is completely printed. There may be a need to visually augment a surface texture of a printed object without re-printing another physical object from the same virtual model with different materials.

Augmented reality (AR) could be employed to visually augment the printed real object by providing an AR visualization of overlaying computer-generated virtual information (i.e. computer-generated image) with a view of the printed object or a part of the printed object. The virtual information can be any type of visually perceivable data such as texture, texts, drawings, videos, or their combination. The view of the printed object or the part of the printed object could be perceived as visual impressions by user's eyes and/or be acquired as an image by a camera.

The overlaid information of the computer-generated image and the real object can be seen by the users in a well-known optical see-through display having semi-transparent glasses. The user then sees through the semi-transparent glasses the real object augmented with the computer-generated image blended in in the glasses. The overlay of the computer-generated image and the real object can also be seen by the users in a video see-though display having a camera and a normal display device. The real object is captured by the camera and the overlay is shown in the display to the users. The overlay of the computer-generated image and the real object may also be realized by using a projector to project the computer computer-generated image onto the real object.

The AR visualization could run on a mobile device equipped with a camera. The equipped camera could capture an image as the view of the at least part of the real object. The mobile device may further have semi-transparent glasses for the optical see-through, or a normal display for the video see-though, or a projector for projecting the computer computer-generated image.

In order to overlay the computer-generated image with the real object at desired positions within the view captured by the eye or the camera, or project the computer-generated image onto desired surfaces of the real object using the projector, the camera of the mobile device could be used to determine a pose of the camera, or the eye, or the projector with respect to the real object. It is particularly necessary to first determine a pose of the camera with respect to the real object based on an image captured by the camera.

A printing coordinate system of the 3D printer defines a coordinate system for a 3D printing process of printing the object. Components related to the 3D printing process, e.g. a print head of the printer or a part of the print head, have known positions in the printing coordinate system. The original position of the printed real object (i.e., no movements occurred after the corresponding 3D printing process is complete) could be known in the printing coordinate system. Therefore, when the printed real object stays at the original place, the pose of the camera or of the eyes with respect to the printed object could be computed according to a pose of the camera or the eyes in the printing coordinate system. Several methods are disclosed in the presented invention for determining a pose of a camera in the printing coordinate system.

When the view is captured as an image by the camera, the captured image may also be used to determine a camera pose of the image with respect to the real object, i.e. the pose of the view with respect to the real object. When the view is captured by the eye, in addition to determining the camera pose, it further needs a spatial relationship between the eyes and the camera or between an eye or head orientation detection system and the camera for determining the pose of the eye with respect to the real object.

Another embodiment for determining the pose of an eye with respect to the real object is to determine a pose of the eye in the printing coordinate system, wherein an eye or head orientation detection system may be placed at a known position in the printing coordinate system and used to detect orientation of the eye. Eberl et al. in references [5, 6] disclose methods and systems for determining orientation of an eye.

For using the projector to project the computer-generated image onto the real object, in addition to determining the camera pose, a spatial relationship between the projector and the camera should be provided for determining a pose of the projector relative to the real object.

It is also possible to mount the projector to the 3D printer at a known location relative to the 3D printer. Then, the pose of the projector relative to the real object printed by the 3D printer at its original position can be directly obtained.

The location of the projector could be pre-known or be calibrated in an off-line calibration procedure. For example, the projector projects a visual pattern on the printing platform of the 3D printer. The projected visual pattern and a part of the 3D printer are captured as an image by a camera. The part of the 3D printer has a known position relative to the 3D printer. Then, the location of the projector could be estimated based on the 2D coordinates of the visual pattern in the projector coordinate system and corresponding image points of the visual pattern in the image.

In order to overlay computer-generated virtual information with an image of the printed object captured by a camera, it is also possible to directly compute the camera pose of the image with respect to the printed object based on a virtual model of the printed object and the image using computer vision methods. This does not require the printed object staying at its original place.

Although this invention has been shown and described with respect to the detailed embodiments thereof, it will be understood by those skilled in the art that various changes in form and detail may be made without departing from the spirit and scope of the invention.

What is claimed is:

1. A method for instructing a 3D printing system comprising a 3D printer having a printing coordinate system operable to print at least one first object onto an existing object, the method comprising:
   obtaining, by at least one camera, at least one image representing at least a part of an existing object;
   determining a camera pose of the at least one camera relative to the existing object when the at least one image is captured;
   determining an alignment between at least part of the existing object and at least part of a first object to be printed on the existing object based, at least in part, on the determined camera pose;
   determining a pose of the existing object relative to a printing coordinate system according to the at least one image; and
   directing a 3D printer to print at least part of the at least one first object onto the existing object according to the pose and the alignment.

2. The method according to claim 1, wherein the at least one image further represents a first part of the 3D printer having a known spatial relationship relative to the printing coordinate system.

3. The method according to claim 2, further comprising:
   computing a translation and a rotation between the first part of the 3D printer and the existing object in a coordinate system of the at least one image.

4. The method according to claim 1, further comprising:
   obtaining at least two images of the existing object captured by the at least one camera, and reconstructing a 3D shape of at least part of the existing object from the at least two images,
   wherein the alignment is determined based at least in part on the reconstructed 3D shape.

5. The method according to claim 1, wherein determining the camera pose comprises determining the camera pose according to a virtual model of the existing object or according to a visual marker rigidly fixed relative to the existing object.

6. The method according to claim 1,
   wherein the at least one camera is placed at a fixed position relative to the printing coordinate system.

7. The method according to claim 6, wherein the at least one camera is mounted to the 3D printer.

8. The method according to claim 6, further comprising computing a pose of the at least one camera in the printing coordinate system in a calibration procedure.

9. The method according to claim 1, further comprising:
determining the camera pose of the at least one camera when capturing the at least one image relative to the printing coordinate system using a tracking system by computing a pose of the at least one camera and a pose of the printing coordinate system in a tracking coordinate system of the tracking system.

10. The method according to claim 1, wherein the existing object is within a printing space of the 3D printer.

11. The method according to claim 1, wherein determining an alignment between at least part of the first object and at least part of the existing object comprises determining the alignment according to a virtual model of the existing object and a virtual model of the first object.

12. The method according to claim 11, wherein the virtual model of the existing object is computed according to the at least one image.

13. A 3D printing system adapted for printing at least one first object onto an existing object comprising:
a 3D printer provided with a printing coordinate system;
a processing device; and
a memory comprising instructions which, when executed by the processing device, cause the processing device to:
obtain, by at least one camera, at least one image representing at least a part of an existing object;
determine a camera pose of the at least one camera relative to the existing object when the at least one image is captured;
determine an alignment between at least part of the existing object and at least part of a first object to be printed on the existing object based, at least in part, on the determined camera pose;
determine a pose of the existing object relative to a printing coordinate system according to the at least one image; and
direct the 3D printer to print at least part of the at least one first object onto the existing object according to the pose and the alignment.

14. A computer program product comprising a non-transitory computer readable storage medium having computer readable software code sections embodied in the medium, which software code sections are configured to:
obtain, by at least one camera, at least one image representing at least a part of an existing object;
determine a camera pose of the at least one camera relative to the existing object when the at least one image is captured;
determine an alignment between at least part of the existing object and at least part of a first object to be printed on the existing object based, at least in part, on the determined camera pose;
determine a pose of the existing object relative to a printing coordinate system according to the at least one image; and
direct a 3D printer to print at least part of the at least one first object onto the existing object according to the pose and the alignment.

15. The 3D printing system according to claim 13, wherein the at least one image further represents a first part of the 3D printer having a known spatial relationship relative to the printing coordinate system.

16. The 3D printing system according to claim 15, further comprising instructions to:
compute a translation and a rotation between the first part of the 3D printer and the existing object in a coordinate system of the at least one image.

17. The 3D printing system according to claim 13, further comprising instructions to:
obtain at least two images of the existing object captured by the at least one camera, and reconstructing a 3D shape of at least part of the existing object from the at least two images,
wherein the alignment is determined based at least in part on the reconstructed 3D shape.

18. The computer program product according to claim 14, wherein the at least one camera is placed at a fixed position relative to the printing coordinate system.

19. The computer program product according to claim 18, wherein the at least one camera is mounted to the 3D printer.

20. The computer program product according to claim 18, further comprising computing a pose of the at least one camera in the printing coordinate system in a calibration procedure.

* * * * *